(12) United States Patent
Schwimley et al.

(10) Patent No.: US 8,016,247 B2
(45) Date of Patent: Sep. 13, 2011

(54) PLASMA FLOW CONTROL ACTUATOR SYSTEM AND METHOD

(75) Inventors: Scott L. Schwimley, Foristell, MO (US); Joseph S. Silkey, Florissant, MO (US)

(73) Assignee: The Boeing Company, Chicago, IL (US)

( * ) Notice: Subject to any disclaimer, the term of this patent is extended or adjusted under 35 U.S.C. 154(b) by 875 days.

(21) Appl. No.: 11/753,876

(22) Filed: May 25, 2007

(65) Prior Publication Data

US 2010/0133386 A1 Jun. 3, 2010

(51) Int. Cl.
*B64C 21/00* (2006.01)
(52) U.S. Cl. .......................... 244/205; 244/200
(58) Field of Classification Search .................. 244/205, 244/208, 200, 204.1, 78.2
See application file for complete search history.

(56) References Cited

U.S. PATENT DOCUMENTS

| | | | |
|---|---|---|---|
| 6,570,333 | B1 | 5/2003 | Miller et al. |
| 7,703,479 | B2 * | 4/2010 | Jacob ............................ 137/828 |
| 2004/0200932 | A1 * | 10/2004 | Scott et al. .................... 244/206 |

FOREIGN PATENT DOCUMENTS

| | | |
|---|---|---|
| EP | 1619118 | 1/2006 |
| EP | 1926353 | 5/2008 |
| EP | 1936116 | 6/2008 |
| WO | WO02/081303 | 10/2002 |
| WO | WO2007133239 | 11/2007 |

OTHER PUBLICATIONS

Louste et al. "Sliding discharge in air at atmospheric pressure: electrical properties." Journal of Electrostatics 63 (2005) 615-620. Available online: Mar. 22, 2005.*

Roy et al. "Effective Discharge Dynamics of Plasma Actuators." 44th AIAA Aerospace Sciences Meeting and Exhibit, Jan. 12, 2006. (AIAA 2006-374).*
Do et al. "Bluff Body FLow Separation Control using Surface Dielectric Barrier Discharges." 45th AIAA Aerospace Sciences Meeting and Exhibit. Jan. 11, 2007. (AIAA 2007-939).*
Sung et al. "Aerodynamic modification of flow over bluff objects by plasma actuation." Experiments in Fluids 41 pp. 479-486. Published online Jul. 18, 2006.*

(Continued)

*Primary Examiner* — Tien Dinh
*Assistant Examiner* — Michael Kreiner
(74) *Attorney, Agent, or Firm* — Harness, Dickey & Pierce, P.L.C.

(57) ABSTRACT

A plasma actuator system and method especially well adapted for use on airborne mobile platforms, such as aircraft, for directional and/or attitude control. The system includes at least one plasma actuator having first and second electrodes mounted on a surface of an aircraft. The first and second electrodes are arranged parallel to a boundary layer flow path over the surface. A third electrode is mounted between the first and second electrodes and laterally offset from the first and second electrodes. A high AC voltage signal is applied across the first and third electrodes, which induces a fluid flow between the energized electrodes that helps to delay separation of the boundary layer. Applying the AC voltage across the second and third electrodes causes an induced fluid flow that creates the opposite effect of influencing the boundary layer flow to separate from the surface. A plurality of the actuators can be selectively placed at various locations on the aircraft, and selectively energized to provide directional control and/or attitude control over the aircraft.

20 Claims, 2 Drawing Sheets

OTHER PUBLICATIONS

Roth, J. Reece. University of Tennessee Plasma Sciences Laboratory, Final Report Grant AF F49620-01-1-0425 (ROTH)—"An Investigation of Flow Acceleration and Electromagnetic Absorption Phenomena Induced by Paraelectric and Peristaltic Electrohydrodynamic Effects of the One Atmosphere Uniform Glow Discharge Plasma", dated Jun. 1, 2001 to Nov. 30, 2003, pp. 1-25.

Hultgren, Lennart S. and Aspis, David E.: "Demonstration of Separation Delay With Glow-Discharge Plasma Actuators", AIAA-2003-1025, No. NASA/TM-2003-212204/REV1, Dec. 2003, XP002496268,11 pages.

Corke, T. C. et al. "Plasma Flapts and Slats: An Application of Weakly-Ionized Plasma Actuators", AIAA. Collection of Technical Papers, AIAA, US, No. Paper-AIAA-2004-2127, Jun. 28, 2004, 9 Pages., XP009114869.

Moreau, Eric. Airflow Control By Non-Thermal Plasma Actuators, Journal of Physics D. Applied Physics, IOP Publishing, Bristol, GB, vol. 40, No. 3, Feb. 7, 2007, pp. 605-636, XP020112117.

Chan, Sammie; Zhang, Xin; and Gabriel, Steve. "The Attenuation of Cavity Tones Using Plasma Actuators", 11th AIAA/CEAS Aeroacoustics Conference, May 23-25, 2005, AIAA 2005-2802, pp. 1-14.

Mitchell, Douglas A. "Control of High Speed Cavity Flow Using Plasma Actuators", Thesis, The Ohio State University, Department of Mechanical Engineering Honors Theses, May 2006, pp. 1-63.

\* cited by examiner

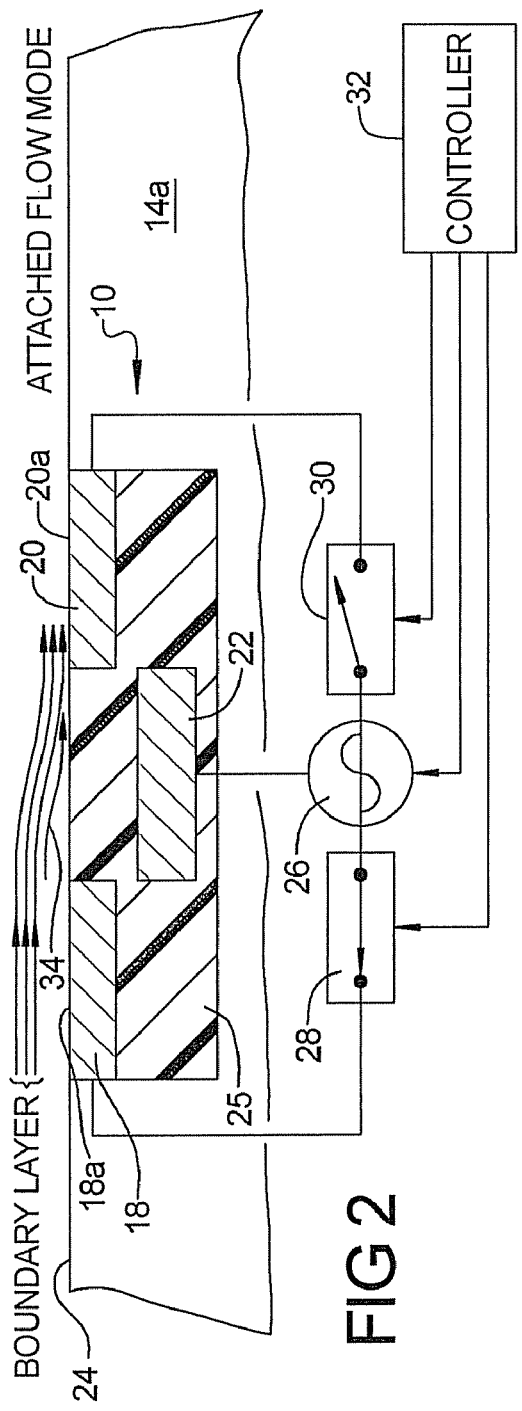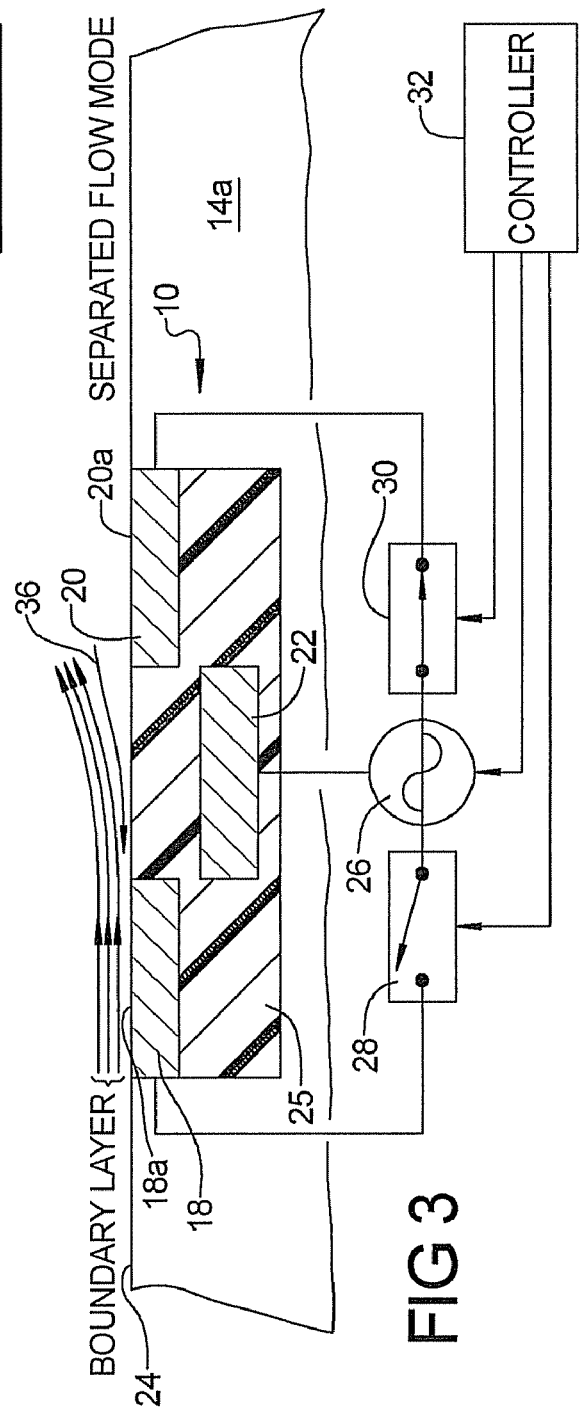

PLASMA FLOW CONTROL ACTUATOR SYSTEM AND METHOD

CROSS-REFERENCE TO RELATED APPLICATIONS

The present application is related in general subject matter to U.S. application Ser. No. 11/753,857, filed May 25, 2007 and U.S. application Ser. No. 11/753,869, filed May 25, 2007.

The present disclosure is also related in general subject matter to U.S. application Ser. No. 11/403,252, filed Apr. 12, 2006, and assigned to The Boeing Company.

All of the above-mentioned applications are hereby incorporated by reference into the present disclosure.

FIELD

The present disclosure relates to flow control systems, and more particularly to a plasma flow control system and method that is selectively controllable to help prevent separation of a boundary layer flow from a surface of a mobile platform or object, or to cause separation of the boundary layer flow from the surface.

BACKGROUND

The statements in this section merely provide background information related to the present disclosure and may not constitute prior art.

To be aerodynamically efficient, airborne mobile platforms such as aircraft and weapons (air vehicles) typically must have highly integrated configurations. These configurations typically need to combine good performance and useful payload with good stability and control characteristics. To achieve this objective, air vehicle configurations should have efficient, effective and robust control effector suites. Removing conventional control surfaces to make the air vehicle aerodynamically more efficient provides a unique challenge in air vehicle stability and control.

Previous work with air vehicles that are tailless and/or hingeless has proven especially challenging in providing vehicle control, especially directional control of the vehicle. A particular problem with hingeless or tailless control is generating directional control at low to moderate angles of attack, with such angles typically being in the range between about 0-4 degrees. At the present time, most aerodynamic methods used for generating directional control at low to moderate angles of attack on an air vehicle involve the use of vertical tails or deflecting a control surface. Providing directional control at low to moderate angles of attack, if any, is a limitation of prior solutions when the vertical tail is removed.

Weight is also an important consideration on many forms of mobile platforms, and particularly airborne mobile platforms such as aircraft. Present day aerodynamic control systems typically employ hinged panels that are deflected to alter the boundary layer flow over a surface of the mobile platform, such as over a trailing edge of a wing. As will be appreciated, hinges and the related linkage and hydraulic or electromechanical actuators needed to employ them can add significant weight to an aircraft, thereby increasing the fuel required for a given flight or mission, or reducing the overall payload of the aircraft.

SUMMARY

The present disclosure relates to a plasma actuator system and method for use on mobile platforms, and particularly on high speed airborne mobile platforms such as jet aircraft. The plasma actuator system forms a flow control apparatus that is useful for controlling a boundary layer flow over a surface of the mobile platform.

In one implementation a method is provided for controlling flight of a mobile platform. The method involves disposing a plasma actuator on a surface of the mobile platform so as to be in a path of a boundary layer flow over the surface. The plasma actuator is controlled to assume a first operating configuration in which the plasma actuator influences the boundary layer flow in a manner to draw the boundary layer toward the surface and maintain the boundary layer flow against the surface. The actuator may also be controlled to assume a second operating configuration in which the plasma actuator influences the boundary layer flow in a manner to cause separation of the boundary layer flow from the surface.

In one specific implementation, disposing the plasma actuator involves disposing a plasma actuator having first and third electrodes spaced apart along a direction of flow of the boundary layer. A third electrode is disposed intermediate the first and second electrodes, and within a plane that is laterally offset from a plane in which the first and second electrodes are disposed. A dielectric material is disposed between the third electrode and the first and second electrodes.

In one embodiment a system for controlling flight of an airborne mobile platform is disclosed. The system includes a plasma actuator disposed adjacent a surface of a mobile platform and an AC voltage source for electrically energizing the plasma actuator. The plasma actuator has a first electrode disposed adjacent the surface of the mobile platform so as to be in a path of a boundary layer flow over the surface, and a second electrode disposed adjacent the surface downstream of the first electrode, relative to a direction of flow of the boundary layer. A third electrode is separated from the first and second electrodes by a dielectric layer, and is disposed between the first and second electrodes and within a plane that is laterally offset from the first and second electrodes. A controller controls the application of an AC voltage from the AC voltage source to the electrodes to at least one of:

apply the AC voltage across the first and third electrodes, to cause ionization of air between the first and third electrodes that delays separation of the boundary layer flow on the surface; and apply the AC voltage across the second and third electrodes, to cause ionization of air between the second and third electrodes that causes separation of the boundary layer flow on the surface.

In one embodiment the system and method forms a plasma actuator that is able to selectively prevent separation of a boundary layer flow from a surface of an object, as well as to cause separation of the boundary layer flow.

BRIEF DESCRIPTION OF THE DRAWINGS

The drawings described herein are for illustration purposes only and are not intended to limit the scope of the present disclosure in any way.

FIG. 2 is an enlarged cross-sectional side view of one of the plasma actuators shown in FIG. 1 taken in accordance with section line 2-2 in FIG. 1, illustrating the actuator energized to delay separation of the boundary layer flow on the surface of the wing, and also showing in simplified form the AC voltage source and the controller used to control the actuator; and FIG. 3 is view of the plasma actuator of FIG. 2, but with the actuator being controlled to cause separation of the boundary layer flow from the surface of the wing.

DETAILED DESCRIPTION

Figure 1:
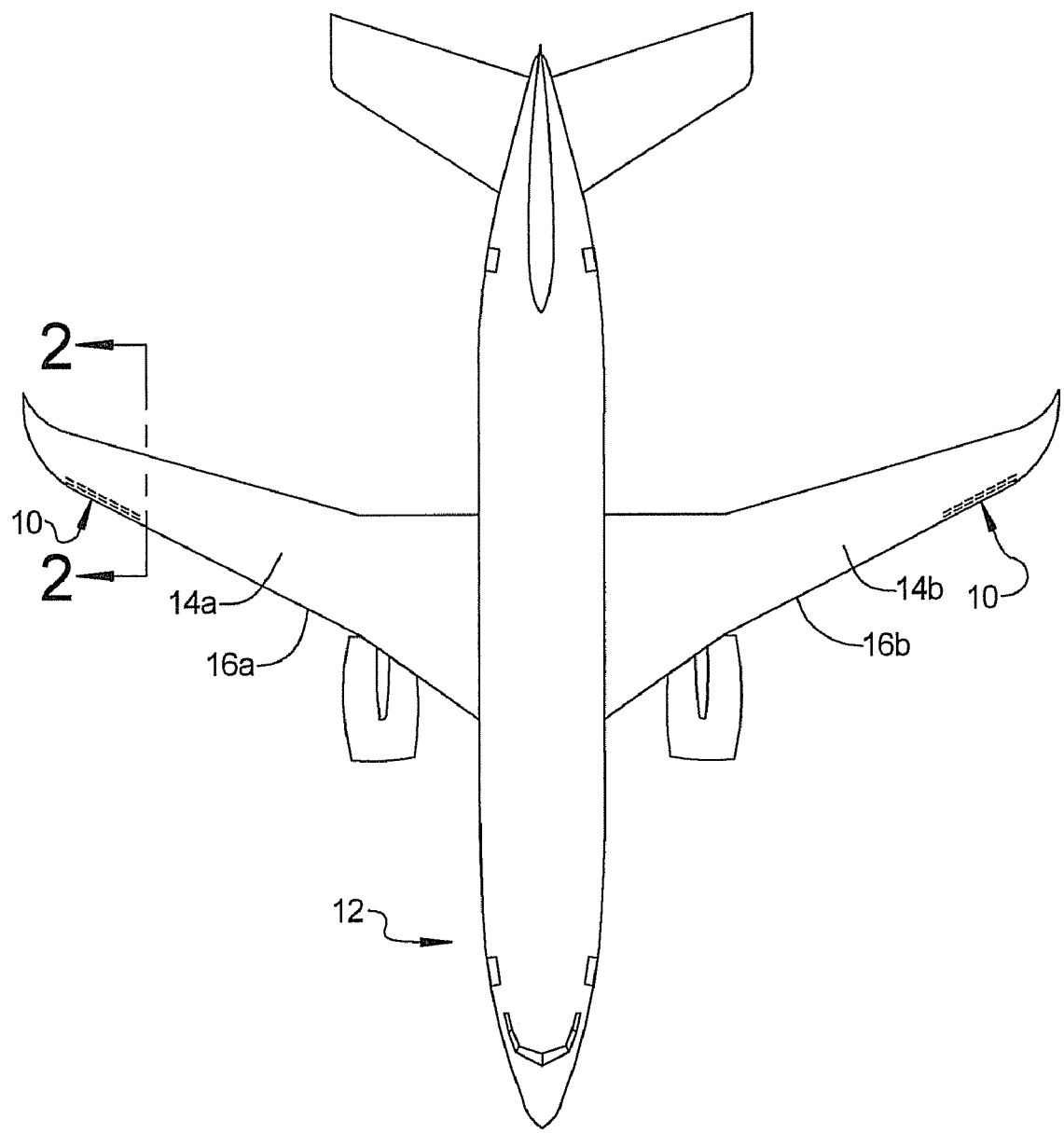
FIG. 1 is a plan view of a mobile platform incorporating a plurality of plasma actuators in accordance with one embodiment of the present disclosure, where the plasma actuators are employed along the leading edges of the wings of an aircraft.

The following description is merely exemplary in nature and is not intended to limit the present disclosure, application, or uses.

Referring to FIG. 1, there is shown a mobile platform, in this example an aircraft 12, incorporating a plurality of plasma actuators 10. In this example the plasma actuators 10 are disposed adjacent leading edges 16a and 16b of the wings 14a and 14b, respectively, of the aircraft 12. It will be appreciated, however, that the plasma actuators 10 may be used on virtually any form of mobile platform where it is desirable to effect directional or attitude control of the mobile platform without the need for hinged or moveable panels. Other possible applications may involve unmanned aircraft, missiles, rotorcraft, high speed land vehicles, and possibly even high speed marine vessels. Also, while the plasma actuators 10 are illustrated on the wings 14a,14b of the aircraft 12, they could just as readily be employed along the fuselage, on the horizontal stabilizers, the vertical tail, boattail or any other location where it may be desirable to influence the boundary layer flow over the aircraft.

In practice, it will often be desirable to include a plurality of the plasma actuators 10 along a surface where control over the boundary layer is needed, as illustrated in FIG. 1. The spacing between adjacent plasma actuators 10, the dimensions of the actuator, and the specific number of actuators, will be determined by the needs of a specific application.

Referring to FIG. 2, one of the plasma actuators 10 is shown from a side cross-sectional view. Each plasma actuator 10 includes a first electrode 18, a second electrode 20 and a third electrode 22. The second electrode 20 is spaced apart from the first electrode 18. Preferably, the electrodes 18 and 20 are recessed mounted in a surface 24 of the wing 14a so that upper surfaces 18a and 20a of the electrodes 18 and 20, respectively, are positioned generally flush with the surface 24, and co-planar with one another. Alternatively, the electrodes 18 and 20 could be mounted on top of the surface 24. Recess mounting of the electrodes 18 and 20, however, will help to maintain the original aerodynamic profile of the wing 14a or other surface with which the actuator 10 is being implemented on and to reduce aerodynamic drag.

The third electrode 22 is mounted between the first electrode 18 and the second electrode 20, and generally longitudinally in line with the electrodes 18 and 20, but is disposed so that it sits laterally offset from (i.e., elevationally below) the electrodes 18 and 20. A dielectric layer of material 25 is provided around the third electrode 22 that separates it from the first and second electrodes 18 and 20, respectively. Each of the electrodes 18, 20 and 22 may be formed with a generally rectangular shape having its major (i.e., long side) axis arranged perpendicular to the direction of flow of the boundary layer. Other orientations are possible as well, depending on the needs of a specific application.

In practice, the electrodes 18,20,22 may be formed from any conductive material. Copper is one material that is particularly suitable. The electrodes 18,20,22 may be formed as thin strips, possibly as foil strips, and may have a typical thickness on the order of about 0.001-0.005 inch (0.0254-0.127 mm). The length and width of each electrode 18,20,22 may vary as needed to suit specific applications, but it is anticipated that in many aircraft applications, the length and width of each electrode may typically be on the order of 1-20 inches (2.54 cm-50.08 cm) for the length and 0.12-0.20 inch (3-5 mm) for the width for each of the electrodes 18 and 20. The width of the buried electrode 22 will typically be wider than that employed for the electrode 22, and typically on the order of 1.0-2.0 inches (2.54 cm-5.08 cm) depending on the operating voltage being supplied by the AC voltage source 26. The dielectric layer of material 25 may comprise any suitable dielectric material, for example quartz, KAPTON® or TEFLON® dielectric materials. Other dielectric materials such as ceramics may also be suitable for use, and the precise dielectric used may be dictated by the needs of a specific application. A portion of the dielectric layer of material 25 may also be used to fill the gap between the first and second electrodes 18 and 20. The elevational spacing of the third electrode 22 from the first and second electrodes 18 and 20, will typically be about 0.003-0.50 inch (0.076-12.7 mm), although this may also vary significantly as well depending on the needs of a specific application.

With further reference to FIG. 2, an AC voltage source 26 is coupled to the third electrode 22 and through a pair of switches 28 and 30 to the first and second electrodes 18 and 22, respectively. The AC voltage source 26 generates a low current, high voltage AC signal, preferably in the range of about 3,000-20,000 volts. The frequency of the AC voltage source 26 is typically between about 1 KHz-20 KHz, but may vary as needed to meet a specific application. The precise output from the AC voltage source 26 is preferably variable to enable the actuator 10 to provide a variable degree of fluid flow control.

A controller 32 is in communication with the switches 28 and 30. The switches 28,30 may be semiconductor switching devices suitable for handling the voltage generated by the AC voltage source 26 or may comprise any other suitable forms of switching devices. As will be described in further detail in the following paragraphs, components 18, 20, 22, 25, 26, 28, 30 and 32 effectively form a "dual mode" plasma actuator apparatus that is able to selectively cause or inhibit separation of the boundary layer from the surface 24. The controller 32 may also be used to control the precise output from the AC voltage source 26. In one implementation, the controller 32 may be used to control the switches 28 and 30 to generate AC voltage pulses that are applied across the electrode pairs 18,22 and 20,22, with a duty cycle between about 10%-100%. Applying a pulsed AC signal to the electrode pairs 18,22 and 20,22 may result in an increase in power efficiency and overall effectiveness of the actuator 10.

Referring further to FIGS. 2 and 3, the operation of the plasma actuator 10 will be described. In FIG. 2, when it is desired to prevent separation of the boundary layer flow from the surface 24, the controller 32 causes switch 28 to be energized (i.e., closed) and switch 30 to be opened. This results in the high AC voltage from the AC voltage source 26 being applied across electrodes 18 and 22. The high voltage causes air in the vicinity of the spacing between electrodes 18 and 22 to be ionized. Ionization typically occurs when an AC voltage of about 3,000 volts is applied across the electrodes 18 and 22. The electric field that is created acts on the ionized air to accelerate the charged particles, which collide with the neutral boundary layer air molecules to create a "wall jet". The strength of the electric field is directly proportional to the magnitude of the applied AC voltage. More particularly, the electric field induces a body force impulse on the ionized air that serves to induce a fluid flow (i.e., the wall jet) very near the surface 24. The induced fluid flow is indicated by arrow 34. The induced fluid flow 34 causes an increase in the momentum of the boundary layer fluid near the surface 24. The resulting induced fluid flow is from the first electrode 18 toward the third electrode 22. The induced fluid flow 34 functions to prevent, or at least significantly delay, separation of the boundary layer from the surface 24. Accordingly, FIG. 2 illustrates what may be viewed as an "attached flow mode" or "first operating configuration" for the actuator 10.

Referring to FIG. 3, when it is desired to cause separation of the boundary layer from the surface 24, the controller 32 energizes (i.e., closes) switch 30 and opens switch 28. This also causes the air in the region between the second electrode 20 and the third electrode 22 to ionize, but the induced fluid flow, represented by arrow 36, is in a direction generally opposite to the induced fluid flow 34. The induced fluid flow 36 serves to cause separation of the boundary layer from the surface 24. Thus, simply by controlling which pair of electrodes 18,22 or 20,22 of each plasma actuator 10 the AC voltage is applied across, the boundary layer flow can be influenced as needed. When a variable AC voltage is applied, then the strength of the electric field, and thus the degree to which the electrodes 18 and 22 influence the boundary layer flow, can be varied. FIG. 3 illustrates what may be viewed as a "separated flow mode" or "second operating configuration" for the actuator 10.

The plasma actuators 10 may be used for directional control purposes, for instance at low angle of attack, by controlling the actuators 10 on the wings 14a and 14b differently. For example, by controlling the plasma actuators 10 on wing 14a so that one effect is achieved, for example preventing flow separation, while controlling the actuators 10 on wing 14b to induce flow separation, directional control of the aircraft 12 can be achieved. The directional control results from the differential drag produced by the cooperative effects of the plasma actuators 10 on the wings 14a and 14b, and the moment arm generated at each wingtip about the centerline of each wing 14a and 14b.

As should be apparent, the above is merely one example of how the plasma actuators 10 may be implemented on the aircraft 12. The plasma actuators 10 may instead be used to generate a differential side force on the fuselage of an aircraft or missile, and thus generate a yawing moment. Alternatively, a differential lift could be generated at the wings 14a and 14b to induce a roll moment.

The elimination or reduction of conventional mechanical/hydraulic drive control effectors can significantly reduce the weight of an aircraft, and thus produce increased mission flight time or range for a given aircraft. The plasma actuators 10 and related system and methodology described herein may be used to replace conventional control effectors such as leading or trailing edge flaps, ailerons, moving tail surfaces and vortex generators, thus reducing weight and drag associated with such components.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A method for controlling flight of an airborne mobile platform, comprising:
   disposing a plasma actuator adjacent a surface of said mobile platform so as to be in a path of a boundary layer flow over said surface;
   controlling said plasma actuator to assume a first operating configuration in which said plasma actuator generates a first induced fluid flow adjacent said surface, and in a common direction with said boundary layer flow, which influences said boundary layer flow to delay separation of said boundary layer flow from said surface; and
   controlling said plasma actuator to assume a second separate operating configuration in which said plasma actuator generates a second induced fluid flow adjacent said surface, and in a direction opposing said boundary layer flow, which induces separation of said boundary layer flow from said surface.

2. The method of claim 1, wherein disposing a plasma actuator comprises:
   disposing a plasma actuator having first and second electrodes spaced apart along a direction of flow of said boundary layer;
   disposing a third electrode intermediate said first and second electrodes, and within a plane that is laterally offset from a plane in which said first and second electrodes are disposed; and
   disposing a dielectric material between said third electrode and said first and second electrodes.

3. The method of claim 2, wherein controlling said plasma actuator to assume a first operating configuration comprises using an alternating current (AC) signal source to apply an AC voltage across said first and third electrodes, said AC voltage causing ionization of air in a vicinity of said first and third electrodes that creates an impulse to form said first induced fluid flow that acts on said boundary layer flow to delay separation of said boundary layer flow from said surface in said vicinity of said first and third electrodes.

4. The method of claim 3, wherein using said alternating current signal source comprises using an alternating current signal source providing a voltage of at least about 3,000 volts.

5. The method of claim 2, wherein controlling said plasma actuator to assume a second operating configuration comprises using an alternating current (AC) signal source to apply an AC voltage across said second and third electrodes, said AC voltage causing ionization of air in a vicinity of said second and third electrodes that creates an impulse to form said second induced fluid flow that acts on said boundary layer flow to cause separation of said boundary layer flow from said surface in said vicinity of said second and third electrodes.

6. The method of claim 5, wherein using said alternating current signal source comprises using an alternating current signal source providing a voltage of between about 3,000-20,000 volts.

7. The method of claim 1, wherein disposing a plasma actuator adjacent a surface of said mobile platform comprises disposing a plasma actuator adjacent a leading edge of a wing of an aircraft.

8. A system for controlling flight of an airborne mobile platform, comprising:
   a plasma actuator disposed adjacent a surface of said mobile platform;
   an AC voltage source for electrically energizing said plasma actuator;
   said plasma actuator having:
      a first electrode disposed adjacent said surface of said mobile platform so as to be in a path of a boundary layer flow over said surface;
      a second electrode disposed adjacent said surface downstream of said first electrode, relative to a direction of flow of said boundary layer;
      a third electrode separated from said first and second electrodes by a dielectric layer, and disposed between said first and second electrodes and within a plane that is laterally offset from said first and second electrodes; and a controller for controlling the application of an AC voltage from said AC voltage source to said electrodes to at least one of:

apply said AC voltage across said first and third electrodes, to cause ionization of air between said first and third electrodes that delays separation of said boundary layer flow on said surface; and apply said AC voltage across said second and third electrodes, to cause ionization of air between said second and third electrodes that causes separation of said boundary layer flow on said surface.

9. The system of claim 8, wherein said first and second electrodes are disposed within a common plane.

10. The system of claim 8, wherein said first and second electrodes are disposed such that an upper surface of each is generally co-planar with said surface of said airborne mobile platform.

11. The system of claim 8, wherein said AC voltage source generates an AC voltage of between about 3,000-20,000 volts.

12. The system of claim 8, wherein said AC voltage source operates at a frequency of between about 1 KHz-20 KHz.

13. The system of claim 8, wherein each of said electrodes forms a rectangular shape when viewed in cross section.

14. The system of claim 8, further comprising at least one switch interposed between said AC voltage source and said one of said electrodes, and responsive to said controller, for controlling the application of said AC voltage to said electrodes.

15. A plasma actuator for influencing a boundary layer flow over a surface of an object, said actuator comprising:

a first electrode disposed adjacent said surface;

a second electrode disposed adjacent said surface and downstream of said first electrode, relative to a flow direction of said boundary layer flow;

a third electrode disposed between said first and second electrodes, and laterally offset from said first and second electrodes; and an AC voltage source for applying an AC voltage across at least one of:

said first and third electrodes, to cause ionization of air between said first and third electrodes that delays separation of said boundary layer flow on said surface; and said second and third electrodes, to cause ionization of air between said second and third electrodes that causes separation of said boundary layer flow on said surface.

16. The plasma actuator of claim 15, wherein said first and second electrodes are disposed in line with one another, relative to said direction of flow of said boundary layer flow.

17. The plasma actuator of claim 16, wherein said first and second electrodes are disposed within a common plane.

18. The plasma actuator of claim 17, wherein said third electrode is separated from said first and second electrodes by a dielectric layer of material.

19. The plasma actuator of claim 15, wherein said first and second electrodes are both disposed such that an upper surface of each is approximately co-planar with said surface of said object.

20. An aircraft comprising:

a plasma actuator for influencing a boundary layer flow over a surface of said mobile platform, said actuator comprising:

a first electrode disposed adjacent said surface;

a second electrode disposed adjacent said surface and downstream of said first electrode, relative to a direction of said boundary layer flow;

a third electrode disposed between said first and second electrodes, and laterally offset from said first and second electrodes; and an AC voltage source for applying an AC voltage across at least one of:

said first and third electrodes, to cause ionization of air between said first and third electrodes that delays separation of said boundary layer flow on said surface; and said second and third electrodes, to cause ionization of air between said second and third electrodes that causes separation of said boundary layer flow on said surface.

* * * * *